(12) United States Patent
Allgaier

(10) Patent No.: US 11,463,133 B2
(45) Date of Patent: Oct. 4, 2022

(54) AGRICULTURAL MACHINES COMPRISING COMMUNICATION SYSTEMS POSITIONED ADJACENT A CAB

(71) Applicant: Precision Planting LLC, Tremont, IL (US)

(72) Inventor: Ryan Allgaier, Tremont, IL (US)

(73) Assignee: Precision Planting LLC, Tremont, IL (US)

( * ) Notice: Subject to any disclaimer, the term of this patent is extended or adjusted under 35 U.S.C. 154(b) by 20 days.

(21) Appl. No.: 16/965,236

(22) PCT Filed: Apr. 1, 2019

(86) PCT No.: PCT/IB2019/052660
§ 371 (c)(1),
(2) Date: Jul. 27, 2020

(87) PCT Pub. No.: WO2019/193481
PCT Pub. Date: Oct. 10, 2019

(65) Prior Publication Data
US 2021/0013931 A1    Jan. 14, 2021

Related U.S. Application Data

(60) Provisional application No. 62/651,449, filed on Apr. 2, 2018.

(51) Int. Cl.
| | | |
|---|---|---|
| *H04B 7/0404* | (2017.01) | |
| *H04B 7/0413* | (2017.01) | |
| *A01B 79/02* | (2006.01) | |
| *A01B 69/00* | (2006.01) | |
| *A01B 79/00* | (2006.01) | |

(52) U.S. Cl.
CPC .......... *H04B 7/0404* (2013.01); *A01B 79/02* (2013.01); *H04B 7/0413* (2013.01); *A01B 69/007* (2013.01); *A01B 79/005* (2013.01)

(58) Field of Classification Search
CPC ..... A01B 79/005; A01B 69/00; A01B 69/007; A01B 79/02; H04B 7/0404; H04B 7/0413
See application file for complete search history.

(56) References Cited

U.S. PATENT DOCUMENTS

| | | | |
|---|---|---|---|
| 9,530,086 B1* | 12/2016 | Stratton | ................ G06Q 50/02 |
| 11,058,326 B1* | 7/2021 | Filipobic | ................ A61B 5/002 |
| 2017/0054204 A1* | 2/2017 | Changalvala | ........ H01Q 1/2291 |

(Continued)

FOREIGN PATENT DOCUMENTS

| | | |
|---|---|---|
| EP | 3 100 601 A1 | 12/2016 |
| JP | 2005 137024 A | 5/2005 |

OTHER PUBLICATIONS

European Patent Office, International Search Report for related International Application No. PCT/IB2019/052660, dated Jun. 25, 2019.

(Continued)

*Primary Examiner* — Rahel Guarino

(57) ABSTRACT

Communication systems positioned within a cab for agricultural operations include at least one antenna element and a communication module having a cellular modem. A machine (e.g., tractor, combine, etc.) for agricultural operations includes a cab for an operator of the machine and a communication system adjacent a window or roof of the cab.

10 Claims, 3 Drawing Sheets

(56) References Cited

U.S. PATENT DOCUMENTS

2017/0187101 A1  6/2017  Freeman et al.
2018/0175478 A1* 6/2018  Morris ................. H01Q 1/1271

OTHER PUBLICATIONS ayrstone.com Blog, RAM mounts for the AyrMesh Cab Hub, accessed Mar. 9, 2018.
cellantenna.com, Glass Mount Antennas, accessed Mar. 9, 2018.
Sam Churchill, Posted on Clearwire in Portland, dated Dec. 2, 2008.
cradlepoint.com, Wireless Portable Routers, accessed Mar. 9, 2018.
SRT Program, published @ https://ewh.ieee.org/r3/daytona/SRTProgramPage1.html, p. 24, accessed Mar. 9, 2018.
Alternative Wireless.Com, Cellular Antennas, accessed Mar. 9, 2018.
Alternative Wireless.Com, Glass Mount Antennas, accessed Mar. 9, 2018.
lairdtech.com, Vehicle Antennas, accessed Mar. 9, 2018.

* cited by examiner

AGRICULTURAL MACHINES COMPRISING COMMUNICATION SYSTEMS POSITIONED ADJACENT A CAB

RELATED APPLICATIONS

This application claims the benefit of U.S. Provisional Patent Application 62/651,449, "COMMUNICATION SYSTEM POSITIONED IN AN ELEVATED POSITION OF A TRACTOR CAB," filed Apr. 2, 2018, the entire contents of which are incorporated by reference herein.

TECHNICAL FIELD

Embodiments of the present disclosure relate to communication systems for mounting in an elevated position of a tractor cab.

BACKGROUND

Planters are used for planting seeds of crops (e.g., corn, soybeans) in a field. Some planters include a display monitor within a cab for displaying a coverage map that shows regions of the field that have been planted. The coverage map of the planter is generated based on planting data collected by the planter. Swath control prevents the planter from planting in a region that has already been planted by the same planter.

Additional data from a remote source may be received by a transceiver of the planter and may be displayed on the display monitor. The transceiver and other electronic components of the planter cause a delay in the updating of data from a remote source to the display monitor.

BRIEF DESCRIPTION OF THE DRAWINGS

The present disclosure is illustrated by way of example, and not by way of limitation, in the figures of the accompanying drawings, in which.

BRIEF SUMMARY

In one embodiment, a machine (e.g., tractor, combine, etc.) for agricultural operations includes a cab for an operator of the machine that includes a roof and at least one window. A communication system is positioned adjacent the window or the roof. The communication system includes antenna elements positioned in close proximity to a wireless network modem to reduce signal degradation.

DETAILED DESCRIPTION

Described herein are communication systems that are positioned within a cab for agricultural operations. In one embodiment, a machine (e.g., tractor, combine, etc.) for agricultural operations includes a cab for an operator of the machine and a communication system positioned near a window of the cab. The communication system includes antenna elements positioned in close proximity to a cellular modem to reduce signal degradation. In the following description, numerous details are set forth. It will be apparent, however, to one skilled in the art, that embodiments of the present disclosure may be practiced without these specific details. In some instances, well-known structures and devices are shown in block diagram form, rather than in detail, in order to avoid obscuring the present disclosure.

Figure 1:
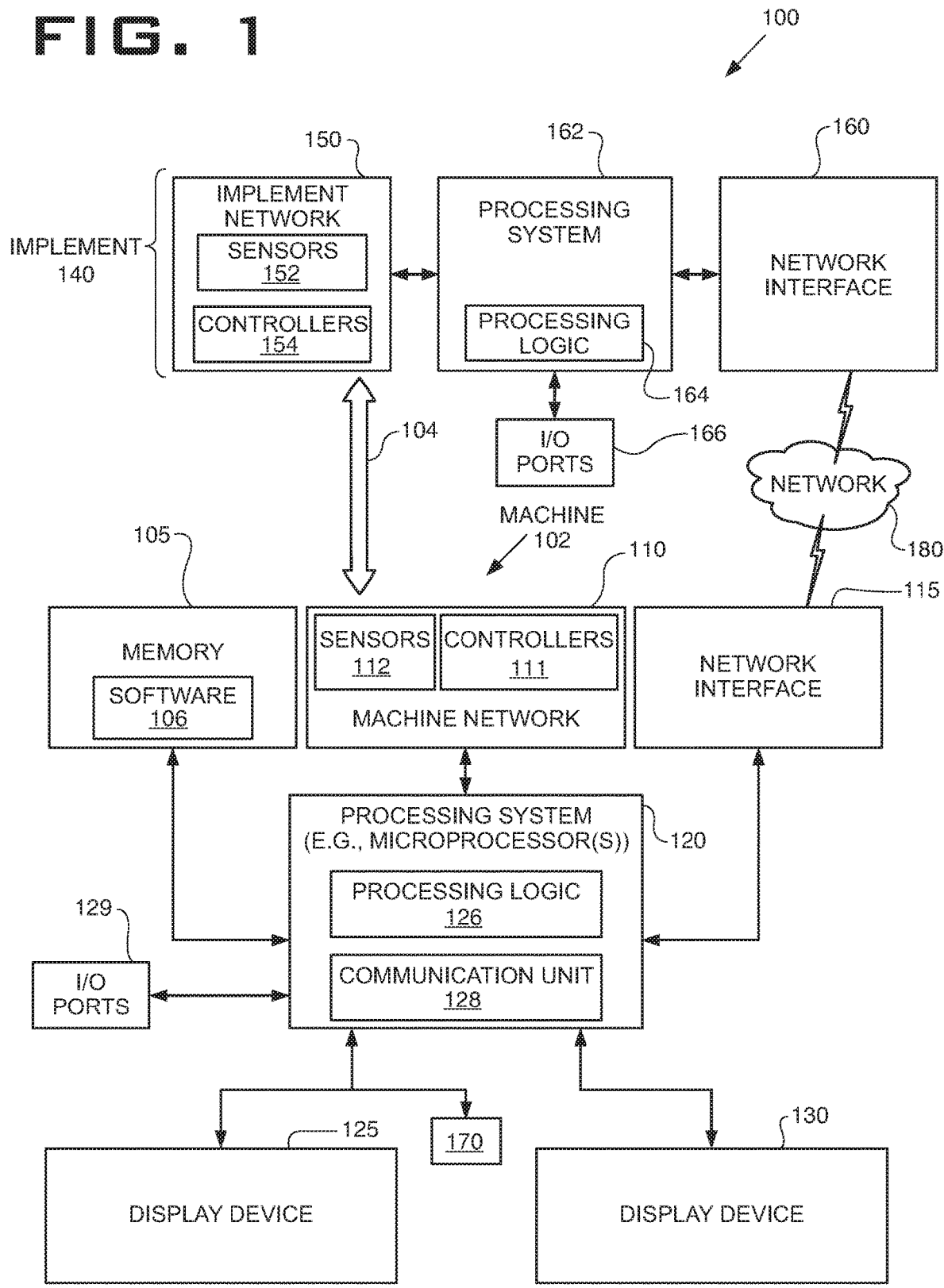
FIG. 1 shows an example of a system 100 that includes a machine 102 (e.g., tractor, combine harvester, etc.), a network 180, and an implement 140 (e.g., planter, cultivator, plough, sprayer, spreader, irrigation implement, etc.) in accordance with one embodiment.

FIG. 1 shows an example of a system 100 that includes a machine 102 (e.g., tractor, combine harvester, etc.), a network 180, and an implement 140 (e.g., planter, cultivator, plough, sprayer, spreader, irrigation implement, etc.) in accordance with one embodiment. The system 100 (e.g., cloud based system) can be utilized for performing agricultural data analysis and agricultural operations. The machine 102 includes a processing system 120, memory 105, machine network 110 (e.g., a controller area network (CAN) serial bus protocol network, an ISOBUS network, etc.), and a network interface 115 for communicating with other systems or devices including the implement 140 and the network 180 (e.g., cellular network, Internet, wide area network, WiMax, satellite, IP network, etc.). The network interfaces 115 and 160 include one or more types of transceivers for communicating via the network 180. In one example, the network interface 115 includes a cellular modem and RF circuitry with an antenna for bi-directional communications with a cellular network 180. The network interface 115 (e.g., communication system 115) can be positioned in an elevated position in a window of a cab of the machine. The machine network 110 includes sensors 112 (e.g., speed sensors) and controllers 111 (e.g., GPS receiver, radar unit) for controlling and monitoring operations of the machine. The network interface 115 can include at least one of a cellular transceiver, GPS transceiver, a WLAN transceiver (e.g., WiFi), an infrared transceiver, a Bluetooth transceiver, Ethernet, or other interfaces from communications with other devices and systems including the implement 140. The network interface 115 may be integrated with the machine network 110 or separate from the machine network 110 as illustrated in FIG. 1. The I/O ports 129 (e.g., diagnostic/on board diagnostic (OBD) port) enable communication with another data processing system or device (e.g., display devices, sensors, etc.).

The processing system 120 may include one or more microprocessors, processors, a system on a chip (integrated circuit), or one or more microcontrollers. The processing system includes processing logic 126 for executing software instructions of one or more programs and a communication unit 128 (e.g., transmitter, transceiver) for transmitting and receiving communications from the machine via machine network 110 or network interface 115 or implement via implement network 150 or network interface 160. The communication unit 128 may be integrated with the processing system or separate from the processing system. In one embodiment, the communication unit 128 is in data communication with the machine network 110 and implement network 150 via a diagnostic port (e.g., OBD) of the I/O ports 129. Processing logic 126 including one or more processors may process the communications received from the communication unit 128 including agricultural data. The system 100 includes memory 105 for storing data and programs for execution (software 106) by the processing system. The memory 105 can store, for example, software components such as an agricultural implement software application for monitoring and controlling field operations, a field and task identification software application or module for identifying one or more fields, or any other software application or module. The memory 105 can be any known form of a machine readable non-transitory storage medium, such as semiconductor memory (e.g., flash; SRAM; DRAM; etc.) or non-volatile memory, such as hard disks or solid-state drive. The system can also include an audio input/output subsystem, which may include a microphone and a speaker configured, for example, for receiving and sending voice commands or for user authentication or authorization (e.g., biometrics). Display devices 125 and 130 can provide visual user interfaces for a user or operator. The display devices 125 and 130 may include display controllers. In one embodiment, the display device 125 is a portable tablet device or computing device with a touchscreen that displays images (e.g., high definition field maps of as-planted or as-harvested data, images for identification of fields and tasks) and data generated by the field and task identification software application or agricultural implement software application and receives input from the user or operator for identifying fields and tasks, correcting identified fields and tasks, or monitoring and controlling field operations. The operations may include configuration of the machine or implement, reporting of data, control of the machine or implement including sensors and controllers, and storage of the data generated. The display device 130 may be a display (e.g., display provided by an original equipment manufacturer (OEM)) that displays images and data for identifying fields and tasks, correcting identified fields and tasks, controlling a machine (e.g., planter, tractor, combine, sprayer, etc.), steering the machine, and monitoring the machine or an implement (e.g., planter, combine, sprayer, etc.) that is connected to the machine with sensors and controllers located on the machine or implement.

A cab control module 170 may include an additional control module for enabling or disabling certain components or devices of the machine or implement. For example, if the user or operator is not able to control the machine or implement using one or more of the display devices, then the cab control module 170 may include switches to shut down or turn off components or devices of the machine or implement.

The implement 140 (e.g., planter, cultivator, plough, sprayer, spreader, irrigation implement, etc.) includes an implement network 150, a processing system 162, a network interface 160, and optional input/output ports 166 for communicating with other systems or devices including the machine 102. The implement network 150 (e.g., a controller area network (CAN) serial bus protocol network, an ISO-BUS network, etc.) includes sensors 152 (e.g., speed sensors, seed sensors for detecting passage of seed, downforce sensors, actuator valves, etc.), controllers 154 (e.g., GPS receiver), and the processing system 162 for controlling and monitoring operations of the machine 102. The sensors 152 may include moisture sensors or flow sensors for a combine, speed sensors for the machine, downforce (e.g., row unit downforce) sensors for a planter, liquid application sensors for a sprayer, or vacuum, lift, or lower sensors for an implement. For example, the sensors 152 may comprise processors in communication with a plurality of seed sensors. The processors are preferably configured to process seed sensor data and transmit processed data to the processing system 162 or 120. The controllers and sensors may be used for monitoring motors and drives on a planter including a variable rate drive system for changing plant populations.

The controllers and sensors may also provide swath control to shut off individual rows or sections of the planter. The sensors and controllers may sense changes in an electric motor that controls each row of a planter individually. These sensors and controllers may sense seed delivery speeds in a seed tube for each row of a planter.

The network interface 160 can be a cellular transceiver, a WLAN transceiver (e.g., WiFi), an infrared transceiver, a Bluetooth transceiver, Ethernet, or other interfaces for communication with other devices and systems, including the machine 102. The network interface 160 may be integrated with the implement network 150 or separate from the implement network 150 as illustrated in FIG. 1.

The implement 140 communicates with the machine 102 via wired and/or wireless bi-directional communications 104. The implement network 150 may communicate directly with the machine network 150 or via the network interfaces 115 and 160. The implement 140 may also be physically coupled to the machine 102 for agricultural operations (e.g., planting, harvesting, spraying, etc.).

The memory 105 may be a machine-accessible non-transitory medium on which is stored one or more sets of instructions (e.g., software 106) embodying any one or more of the methodologies or functions described herein. The software 106 may also reside, completely or at least partially, within the memory 105 and/or within the processing system 120 during execution thereof by the system 100, the memory and the processing system also constituting machine-accessible storage media. The software 106 may further be transmitted or received over a network via the network interface device 115.

While the machine-accessible non-transitory medium (e.g., memory 105) is shown in an exemplary embodiment to be a single medium, the term "machine-accessible non-transitory medium" should be taken to include a single medium or multiple media (e.g., a centralized or distributed database, and/or associated caches and servers) that store the one or more sets of instructions. The term "machine-accessible non-transitory medium" shall also be taken to include any medium that is capable of storing, encoding or carrying a set of instructions for execution by the machine and that cause the machine to perform any one or more of the methodologies of the present invention. The term "machine-accessible non-transitory medium" shall accordingly be taken to include, but not be limited to, solid-state memories, optical and magnetic media, and carrier wave signals.

Figure 2:
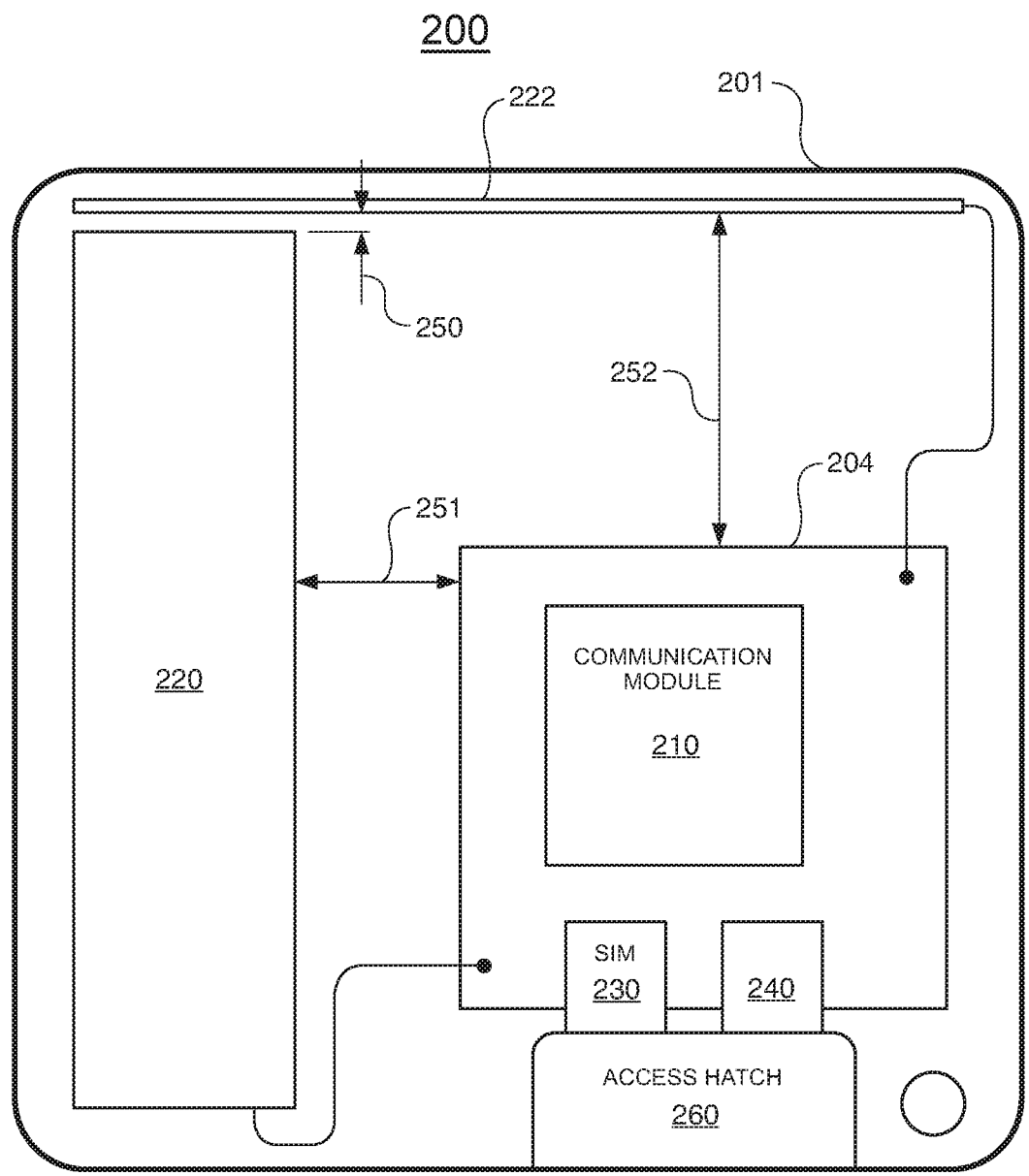
FIG. 2 illustrates a block diagram of one embodiment of a communication system 200 of a tractor cab for communications being transmitted to and received from a network.

FIG. 2 illustrates a block diagram of one embodiment of a communication system 200 of a tractor cab for communications being transmitted to and received from a network. The communication module may include processing logic that may comprise hardware (circuitry, dedicated logic, etc.), software (such as is run on a general purpose computer system or a dedicated machine or a device), or a combination of both. In one embodiment, the integrated communication system 200 includes antenna elements 220, 222, communication module 204 having RF circuitry, a communication module 210 (e.g., cellular modem), and a subscriber identity module 230 (SIM).

The communication system 200 includes a housing or box 201 with an access hatch 260 that is positioned in close proximity to a window of a tractor cab. In one example, the communication system is mounted adjacent or attached to a window of a tractor cab (preferably near the top to the cab). As used herein, "near" means that communication system 200 is positioned in a top half of the vertical height of the window. In other embodiment, communication system 200 is positioned in the top quarter of the vertical height of the window. In another embodiment, at least a portion of communication system 200 is positioned in a top 10% of the vertical height of the window. The antenna elements 220 and 222 are separated by a distance 250. The distance 250 may be, for example, a minimum of 1/4 wavelength of a frequency of interest (e.g., a frequency that the antennas 220 and 222 use to communicate). The antennas 220 and 222 (e.g., cellular antennas) can be shaped in numerous different types of antenna structures and also have different orientations to maximize signal transmission and reception for a particular wireless network. In one example, the antenna 220 is a primary antenna and antenna 222 is a diversity antenna (e.g., receive only). The antenna structure includes at least one antenna (e.g., 1 antenna, 2 antennas, 3 antennas, etc.). Additional antennas typically increase bandwidth for the transmission and receiving of communications.

In one example, the antenna elements 220 and 222 are positioned within the housing 201. In another example, the antenna elements 220 and/or 222 are integrated with the housing 201. For example, the antenna elements 220 and/or 222 may form an external surface of the housing 201. In another example, the antenna elements 220 and/or 222 include static stickers that may be applied to a window of the tractor cab. The static sticker can include a logo for marketing purposes in addition to the antenna function.

Distances 251 and 252 from the antennas 220 and 222 to the communication module 204 may be selected (e.g., minimized) to reduce signal degradation for the integrated antenna cellular modem. The communication module 210 (e.g., cellular modem) receives RF signals from the antennas 220 and 222 and converts the signals into cellular signals that are then transmitted to a data cable 240 (e.g., USB, Cat 5, USB 2.0 (480 mbit/sec), USB 3.0 (~5,000 mbit/sec), Gigabit ethernet (1,000 mbit/sec), etc.) connected to (e.g., plugged in to) the housing 201. The housing 201 can be attached e.g., to a window of the tractor cab or other material transparent to certain electromagnetic radiation by any connector that allows adherence of the housing 201. Examples include, but are not limited to, suction cups, adhesive, Velcro, or Dual Lock. In one example, the communication system can be positioned in any elevated position of the cab. In another example, the communication system can also be positioned in close proximity to a roof of the cab (e.g., slightly below the roof, integrated with the roof, on top of the roof, etc.).

Figure 3:
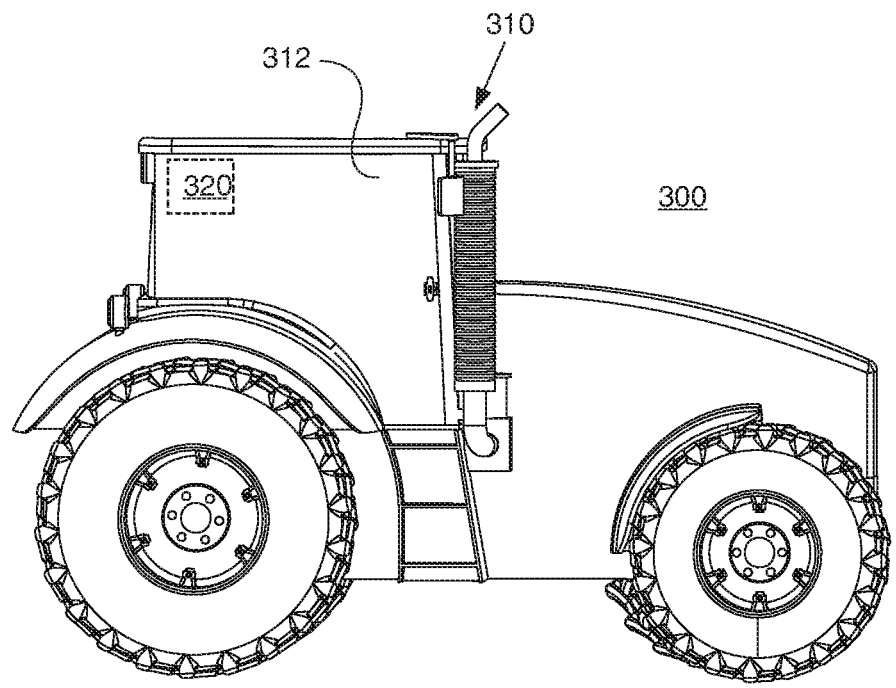
FIG. 3 shows a side view of a machine 300 (e.g., tractor, combine harvester, etc.) having a cab with a communication system in accordance with one embodiment.

FIG. 3 shows a side view of a machine 300 (e.g., tractor, combine harvester, etc.) having a cab with a communication system in accordance with one embodiment. The machine 300 includes a cab 310 having multiple windows including a window 312. A communication system 320 (e.g., communication system 200) is positioned in an elevated position of the cab 310 and attached to the window 312 of the cab 310 to improve transmission and reception of wireless communications being sent to and received from a network 180. A connection on the communication system 320 can plug into a data cable (e.g., USB 240, Cat 5, etc.). The communication system 320 can be attached with an attachment means (e.g., suction cups, adhesive, Velcro, or Dual Lock) to the window 312 of the cab 310.

Figure 4:
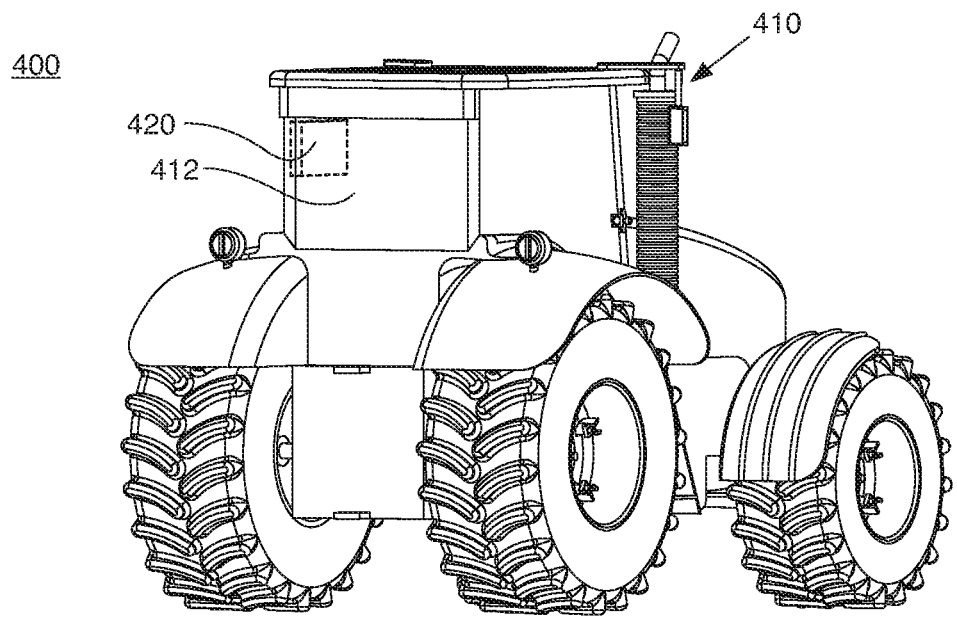
FIG. 4 shows a rear view of a machine 400 (e.g., tractor, combine harvester, etc.) having a cab with a communication system in accordance with one embodiment.

FIG. 4 shows a rear view of a machine 400 (e.g., tractor, combine harvester, etc.) having a cab 410 with a communication system in accordance with one embodiment. The cab 410 has multiple windows including a rear window 412. A communication system 420 (e.g., communication system 200) is positioned in an elevated position adjacent the rear window 412 of the cab 410 to improve transmission and reception of wireless communications being sent to and received from a network 180 (FIG. 1). A connection on the communication system 420 can plug into a data cable (e.g., USB 240, Cat 5, etc.). The communication system 420 can be attached with an attachment means (e.g., suction cups, adhesive, Velcro, or Dual Lock) to the rear window 412 of the cab 410.

Though described herein with respect to agricultural machines, the communication systems 200, 320, 420 may be used in conjunction with any vehicle. For example, the communication systems 200, 320, 420 in on-road commercial vehicles (e.g., trucks), off-road recreational vehicles, construction vehicles, trains, etc.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A machine for agricultural operations, comprising:
   a cab for an operator of the machine, the cab comprising a roof and at least one window; and
   a communication system attached to the at least one window, the communication system including a primary antenna, a diversity antenna, and a communication module having a cellular modem, wherein a first distance from the primary antenna to the communication module and a second distance from the diversity antenna to the communication module are selected to reduce signal degradation for the communication system.

2. The machine of claim 1, wherein the communication system is positioned in an elevated position of the cab adjacent the roof of the cab.

3. The machine of claim 1, wherein the at least one window comprises a side window of the cab.

4. The machine of claim 1, wherein the at least one window comprises a rear window of the cab.

5. The machine of claim 1, wherein the at least one window comprises a front window of the cab.

6. The machine of claim 1, wherein the communication system further comprises a housing enclosing the cellular modem.

7. The machine of claim 6, wherein the primary antenna and the diversity antenna are positioned within the housing.

8. The machine of claim 6, wherein the primary antenna and the diversity antenna are integrated with the housing.

9. The machine of claim 6, wherein the primary antenna and the diversity antenna form an external surface of the housing.

10. A machine for agricultural operations, comprising:
    a cab for an operator of the machine, the cab comprising a roof and at least one window; and
    a communication system attached to the at least one window, the communication system including at least one antenna element, a communication module having a cellular modem, and a housing enclosing the cellular modem, wherein the at least one antenna element is a static sticker affixed to a window of the cab.

* * * * *